(12) United States Patent
Liu

(10) Patent No.: US 12,093,071 B2
(45) Date of Patent: Sep. 17, 2024

(54) STORAGE-FACILITATED SHAFT JOYSTICK

(71) Applicant: Shenzhen Qanba Technology Development Co., Ltd, Shenzhen (CN)

(72) Inventor: Kai Liu, Shenzhen (CN)

( * ) Notice: Subject to any disclaimer, the term of this patent is extended or adjusted under 35 U.S.C. 154(b) by 0 days.

(21) Appl. No.: 18/124,002

(22) Filed: Mar. 21, 2023

(65) Prior Publication Data

US 2023/0221753 A1 Jul. 13, 2023

(30) Foreign Application Priority Data

May 10, 2022 (CN) .......................... 202221127426.X

(51) Int. Cl.
*G05G 9/047* (2006.01)
*A63F 13/24* (2014.01)
(52) U.S. Cl.
CPC ............. *G05G 9/047* (2013.01); *A63F 13/24* (2014.09); *G05G 2009/04703* (2013.01)
(58) Field of Classification Search
CPC ..................... G05G 2009/04703; G05G 9/047
See application file for complete search history.

(56) References Cited

U.S. PATENT DOCUMENTS

| 2003/0144752 | A1 | 7/2003 | Furukawa |
| 2004/0095320 | A1 | 5/2004 | Furukawa |
| 2018/0321704 | A1 | 11/2018 | Sirohiwala et al. |
| 2019/0015742 | A1* | 1/2019 | Strahle ................... A63F 13/23 |
| 2020/0183381 | A1* | 6/2020 | Deng ................... G05D 1/0094 |

FOREIGN PATENT DOCUMENTS

| EP | 0279897 A2 | * | 8/1988 | |
| JP | 3241506 U | * | 4/2023 | ............ A63F 13/211 |
| KR | 200483609 Y1 | * | 6/2017 | |
| KR | 200494308 Y1 | * | 6/2021 | |
| KR | 20210080144 A | * | 6/2021 | |

OTHER PUBLICATIONS

USPTO Machine Translation of the Description of KR 20210080144 A1, Kim, Jun. 5, 2017. (Year: 2024).*

* cited by examiner

*Primary Examiner* — Daniel D Yabut

(74) *Attorney, Agent, or Firm* — Zhigang Ma

(57) ABSTRACT

A storage-facilitated shaft joystick is provided, which relates to the technical field of game peripherals. The storage-facilitated shaft joystick includes a shell and a lever; one end of the lever is detachably assembled in the shell through a bolt; an unlocking end of the shell close to the bolt is movably provided with an unlocking hole cap for locking or unlocking the bolt; and a placement tray for storing the removed lever is arranged on the shell. By the adoption of the above technical solution, the storage-facilitated shaft joystick has reasonable overall structure, does not require an extra removal and storage tool, and has the advantages of practicability, quickness and convenience in removal and storage.

8 Claims, 4 Drawing Sheets

STORAGE-FACILITATED SHAFT JOYSTICK

TECHNICAL FIELD

The present disclosure relates to the technical field of game peripherals, specifically to a storage-facilitated shaft joystick.

BACKGROUND

Shaft joystick is a common component of an electronic game console. By manipulating its buttons and lever, simulated characters on mobile phones, computers and other electronic devices can be controlled to achieve the purpose of playing a game.

At present, a shaft joystick with a lever has a simple structure. The lever with an extremely large height is hard to remove and store. To mount a ball top of the lever, a rear cover of a main unit needs to be disassembled, and the ball top can be unscrewed only by a slot type screwdriver tool. As a result, it is difficult for assembling and disassembling. In an actual use process, parts are easily lost. The user experience is unideal. Therefore, improvement is urgently needed.

SUMMARY

The present disclosure aims to provide a storage-facilitated shaft joystick for the defects and shortcomings in the prior art. The storage-facilitated shaft joystick has a reasonable overall structure, does not require extra removal and storage tools, and has the advantages of practicability, quickness and convenience in removal and storage.

In order to achieve the above objective, the technical solution adopted in the present disclosure is as follows: A storage-facilitated shaft joystick includes a shell and a lever; one end of the lever is detachably assembled in the shell through a bolt; an unlocking end of the shell close to the bolt is movably provided with an unlocking hole cap for locking or unlocking the bolt; and a placement tray for storing the removed lever is arranged on the shell.

In a further setting of the present disclosure, a function button region, a touch region and a game button region are arranged on a surface of the shell; and a distance between a button on one side of the game button region close to the lever and a center of the lever is 60-110 mm.

In a further setting of the present disclosure, the distance between the button on one side of the game button region close to the lever and the center of the lever is 105 mm.

In a further setting of the present disclosure, the unlocking hole cap includes a rotary hole cap piece and a hardware unlocking member; a mounting slot is formed in an unlocking end of the shell close to the bolt; at least one open position for picking and placing the unlocking hole cap and one close position for preventing the unlocking hole cap from falling off are arranged on the mounting slot.

In a further setting of the present disclosure, a hand support portion is arranged on one side of the shell; and the hand support portion includes a hand supporting region and a 45-degree wrist fitting region.

In a further setting of the present disclosure, a storage cavity is arranged in a space below the 45-degree wrist fitting region; and the placement tray is arranged in the storage cavity.

In a further setting of the present disclosure, the storage cavity is also used for storing a USB data wire.

By the adoption of the above technical solution, the present disclosure has the following beneficial effects.

1. In the present disclosure, by means of arranging the built-in unlocking hole cap on the shell, a removal tool for the lever can be obtained directly from the shell to lock or unlock the bolt to mount and remove the lever. Furthermore, the removed lever can be stored in the placement tray, which effectively avoids loss of parts. The storage-facilitated shaft joystick has a reasonable overall structure, does not require extra removal and storage tools, and has the advantages of practicability, quickness and convenience in removal and storage.

2. In the present disclosure, the lever and the game button region on the surface of the shell is reasonable in layout. The distance between the button on one side of the game button region close to the lever and the center of the lever is 60-110 mm, which can effectively solve the problem that an input conflict caused by mutual touch of both hands of an operator with large hands may affect the input accuracy of a whole game.

BRIEF DESCRIPTION OF THE DRAWINGS

In order to describe the embodiments of the present disclosure or the technical solutions in the prior art more clearly, drawings required to be used in the embodiments or the illustration of the existing art will be briefly introduced below. Obviously, the drawings in the illustration below are merely some embodiments of the present disclosure. Those ordinarily skilled in the art also can acquire other drawings according to the provided drawings without doing creative work.

Figure 1:
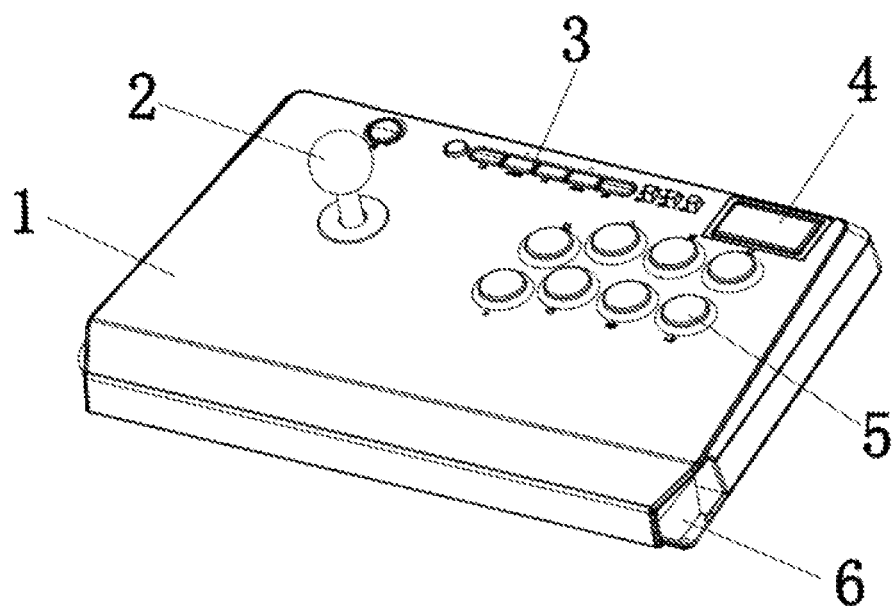
FIG. 1 is a schematic structural diagram of this embodiment.

Numerals in the drawings:
- 1: shell; 2: lever; 3: function button region; 4: touch region; 5: game button region; 6: placement tray; 7: bolt; 8: unlocking hole cap; 81: rotary hole cap piece; 82: hardware unlocking member; 9: mounting slot; 91: open position; 92: close position; 10: hand support portion; 11: hand supporting region; 12: 45-degree wrist fitting region; 20: storage cavity; 30: USB data wire; and 40: antiskid pad.

DETAILED DESCRIPTION OF THE EMBODIMENTS

The present disclosure is further described in detail below in combination with accompanying drawings.

This specific embodiment is only an explanation of the present disclosure, and it is not a limitation to the present disclosure. After reading this specification, those skilled in the art can make modifications to this embodiment that do not create any contribution as needed, but the modifications shall be protected by the patent law within the scope of the claims of the present disclosure.

In the prior art, main structural components of a shaft joystick include a shell, a lever, a plurality of elastic trigger buttons (silicone buttons or Dome buttons) and s trigger printed circuit board (PCB). The trigger buttons are mounted in a fixed support on the shell, and the trigger PCB is mounted in the shell and located below the fixed support. By means of manipulating and pressing a certain trigger button, the trigger button is compressed and moves toward the trigger PCB to contact the trigger PCB to trigger a corresponding function. The lever is movably connected with the shell. When triggered by a user, the lever will move relative to a lever support to generate a corresponding lever operation signal.

This embodiment relates to a storage-facilitated shaft joystick, including a shell 1 and a lever 2. As shown in FIG. 1 to FIG. 4, one end of the lever 2 is detachably assembled in the shell 1 through a bolt 7. An unlocking end of the shell 1 close to the bolt 7 is movably provided with an unlocking hole cap 8 for locking or unlocking the bolt 7. A placement tray 6 for storing the removed lever 2 is arranged on the shell 1. Therefore, when a ball top of the lever 2 is removed or mounted, it is not necessary to open the entire shell 1, but only the built-in unlocking hole cap 8 is taken down. The bolt 7 is locked or unlocked by using the unlocking hole cap 8 to mount or remove the lever 2, thus achieving the characteristics of practicability, quickness, convenient storage and the like. As shown in FIG. 1, the placement tray 6 for storing the removed lever 2 is arranged on the shell 1. Thus, accessories such as the ball top and a plastic shaft of the removed lever 2 can be stored, which effectively prevents loss of parts, and the parts are very convenient to use, thus facilitating storage and transportation of products.

As shown in FIG. 1, a surface of the shell 1 is provided with a function button region 3, a touch region 4, and a game button region 5. The function button region 3 is arranged in the outermost row of the shaft joystick to control the selection of game functions. The touch region 4 is arranged at the upper right side of the shaft joystick to increase the touch control of a game. The game button region 5 is arranged at the left center and is symmetric with the lever 2. In this embodiment, based on a button of the game button region 5 closest to the lever 2, a distance between a center of the button and a center of the lever 2 is 60-110 mm.

According to the human engineering design, if the distance between the center of the button on one side of the game button region 5 close to the lever 2 and the center of the lever 2 is 60 mm, an operator feels most comfortable, with both hands cooperating with each other most quickly. However, both hands of most operators with large hands easily touch each other, which will generate an input error, and even cause injury. This lever 2 solves the problem of an input conflict caused by mutual touch of both hands of an operator with large hands. In this embodiment, the distance of 60-110 mm is data obtained by a test in which many game players participate. Preferably, the distance between the button on one side of the game button region 5 close to the lever 2 and the center of the lever 2 is 105 mm which is a distance that the operator with large hands feels best and most comfortable.

Figure 2:
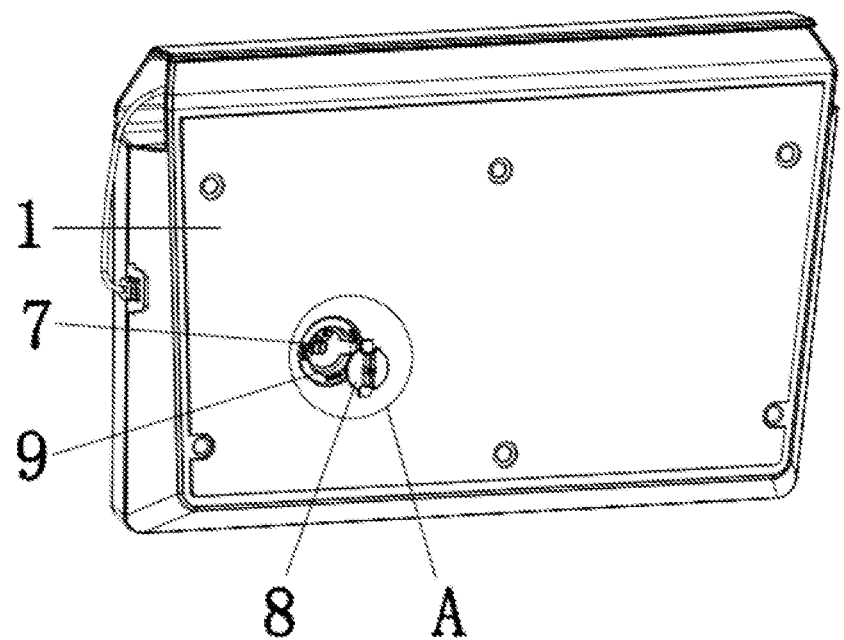
FIG. 2 is another schematic structural diagram in this embodiment.
Figure 3:
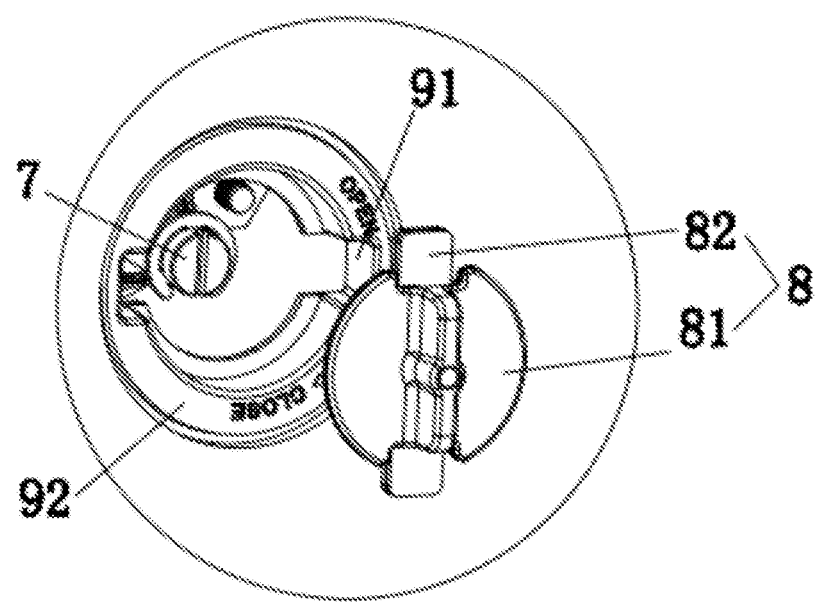
FIG. 3 is a schematic enlarged diagram of the part A in FIG. 2.

As shown in FIG. 2 to FIG. 3, the unlocking hole cap 8 includes a rotary hole cap piece 81 and a hardware unlocking member 82. Specifically, the bolt 7 in this embodiment is a slot type bolt 7, so the hardware unlocking member 82 on the unlocking hole cap 8 is slot type. The rotary hole cap piece 81 is provided with a holding portion for user operation, and the slot type hardware unlocking member 82 is symmetrically arranged on the rotary hole cap piece 81.

A mounting slot 9 is formed in an unlocking end of the shell 1 close to the bolt 7. At least one open position 91 for picking and placing the unlocking hole cap 8 and one close position 92 for preventing the unlocking hole cap 8 from falling off are arranged on the mounting slot 9.

As shown in FIG. 3, to remove the lever 2, the rotary hole cap piece 81 is held and rotated a certain angle to the left/right until the hardware unlocking member 82 is aligned with the open position 91 of the mounting slot 9. The entire unlocking hole cap 8 is then taken down, so that the unlocking end of the bolt 7 is exposed in the mounting slot 9. A user can unscrew the bolt 7 using the hardware unlocking member 82 to remove the lever 2. After the removal is completed, the hardware unlocking member 82 is aligned with the open position 91 and is inserted into the mounting slot 9; the rotary hole cap piece 81 is operated and rotated a certain angle to the close position 92 to complete mounting of the unlocking hole cap 8.

In this embodiment, a hand support portion 10 is arranged on one side of the shell 1. The hand support portion 10 includes a hand supporting region 11 and a 45-degree wrist fitting region 12. A bottom of the shell 1 is provided with a full surface antiskid pad 40. The hand supporting region 11 is arranged below the lever 2 and the game button region 5. The 45-degree wrist fitting region 12 is arranged on an inner side the shaft joystick and connected with the hand supporting region 11. When in use, the bottom antiskid pad 40 contacts a bearing surface to play a good antiskid role, making the shaft joystick not easy to move, and the wrist of the user is successively supported by the 45-degree wrist fitting region 12 and the hand supporting region 11, which is conductive to uniform supporting of the hand and improving the operation convenience of the hand.

Figure 4:
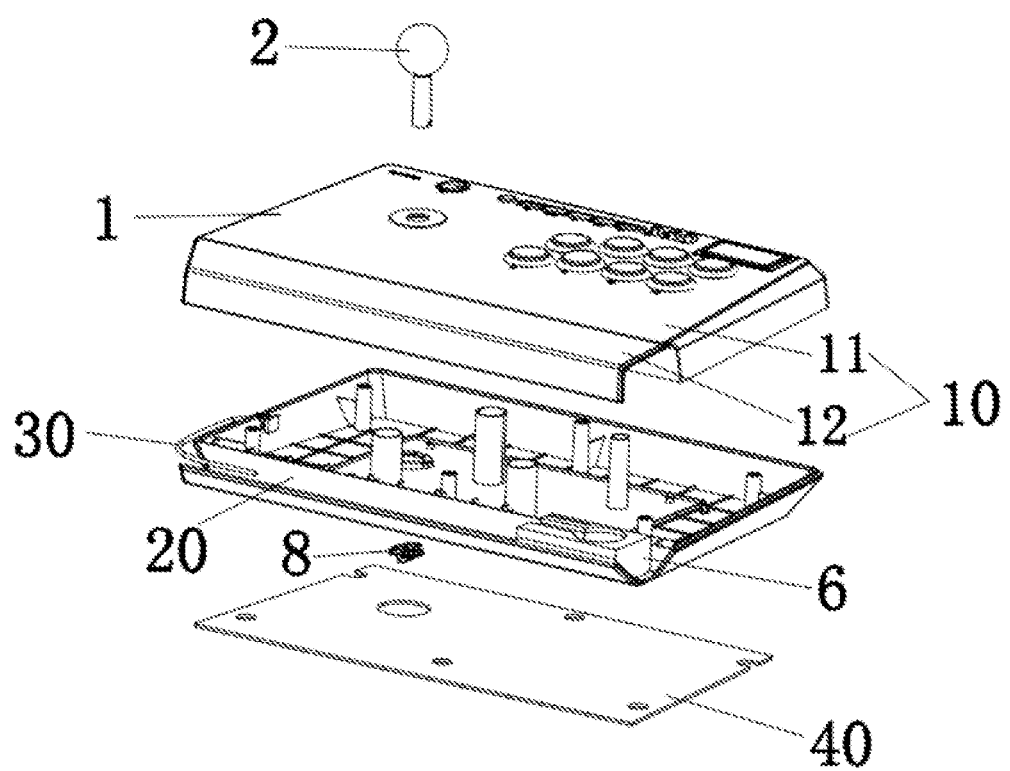
FIG. 4 is a schematic exploded diagram in this embodiment.

As shown in FIG. 4, a storage cavity 20 is arranged in a space below the 45-degree wrist fitting region 12. The placement tray 6 is arranged in the storage cavity 20. The storage cavity 20 is also used for storing a USB data wire 30, so that the whole shaft joystick is stored reasonably. The existing structural space is fully used. Furthermore, the structure is simple and reasonable, so that convenient storage is achieved, and low cost is maintained.

It should be noted that in this embodiment, a height of the storage cavity 20 in the space below the 45-degree wrist fitting region 12 is greater than a sum of a height of the placement tray 6 and a height of a ball top of the lever 2. Therefore, when the ball top of the lever 2 is stored, the user can smoothly place the lever 2 into the placement tray 6 through the remaining space of the storage cavity 20, and can also smoothly take out the lever 2 relative to the placement tray 6. In other embodiments, the placement tray 6 and an inner wall of the storage cavity 20 can also adopt any assembling method of sliding, clamping and magnetic attraction, so that it is convenient to take out the entire placement tray 6 to pick and place the lever 2, and the use is more convenient.

The working principle of the present disclosure is roughly as follows: On the one hand, in this embodiment, by means of arranging the built-in unlocking hole cap 8 on the shell 1, a removal tool for the lever 2 can be obtained directly from the shell 1 to lock or unlock the bolt 7 to mount and remove the lever 2. Furthermore, the removed lever 2 can be stored in the placement tray 6, which effectively avoids loss of parts. The storage-facilitated shaft joystick has a reasonable overall structure, does not require extra removal and storage tools, and achieves the characteristics of practicability, quickness and convenience in removal and storage. On the other hand, the lever 2 and the game button region 5 on the surface of the shell 1 is reasonable in layout. The distance between the button on one side of the game button region 5 close to the lever 2 and the center of the lever 2 is 60-110 mm, which can effectively solve the problem that an input conflict caused by mutual touch of both hands of an operator with large hands may affect the input accuracy of a whole game.

The above is only used to explain the technical solution of the present disclosure, but not to limit the technical solution. Other modifications or equivalent substitutions made by those of ordinary skill in the art to the technical solution of the present disclosure shall fall within the scope of the claims of the present disclosure without departing from the spirit and scope of the technical solution of the present disclosure.

What is claimed is:

1. A storage-facilitated shaft joystick, comprising a shell (1) and a lever (2), wherein
    one end of the lever (2) is detachably assembled in the shell (1) through a bolt (7); an unlocking end of the shell (1) is movably provided with an unlocking hole cap (8) for locking or unlocking the bolt (7); and a placement tray (6) for storing the removed lever (2) is arranged on the shell (1); wherein a hand support portion (10) is arranged on one side of the shell (1); and the hand support portion (10) comprises a hand supporting region (11) and a 45-degree wrist fitting region (12), a storage cavity (20) is arranged in a space below the 45-degree wrist fitting region (12); and the placement tray (6) is arranged in the storage cavity (20).

2. The storage-facilitated shaft joystick according to claim 1, wherein a function button region (3), a touch region (4) and a game button region (5) are arranged on a surface of the shell (1); and
    a distance between a button on one side of the game button region (5) close to the lever (2) and a center of the lever (2) is 60-110 mm.

3. The storage-facilitated shaft joystick according to claim 2, wherein the distance between the button on one side of the game button region (5) close to the lever (2) and the center of the lever (2) is 105 mm.

4. The storage-facilitated shaft joystick according to claim 1, wherein the unlocking hole cap (8) comprises a rotary hole cap piece (81) and a hardware unlocking member (82);
    a mounting slot (9) is formed in an unlocking end of the shell (1); at least one open position (91) for picking and placing the unlocking hole cap (8) and one close position (92) for preventing the unlocking hole cap (8) from falling off are arranged on the mounting slot (9).

5. The storage-facilitated shaft joystick according to claim 4, wherein the bolt (7) is a slot type bolt; the hardware unlocking member (82) on the unlocking hole cap (8) is slot type; a holding portion is arranged on the rotary hole cap piece (81); and two slot type hardware unlocking members (82) are symmetrically arranged on the rotary hole cap piece (81).

6. The storage-facilitated shaft joystick according to claim 4, wherein the rotary hole cap piece (81) is held, so that the rotary hole cap piece (81) is rotated a certain angle to the left or the right until the hardware unlocking member (82) is aligned with the open position (91) of the mounting slot (9); the entire unlocking hole cap (8) is taken down, so that the unlocking end of the bolt (7) is exposed in the mounting slot (9); the bolt (7) is unscrewed using the hardware unlocking member (82) to remove the lever (2); the hardware unlocking member (82) is aligned with the open position (91) and is inserted into the mounting slot (9); the rotary hole cap piece (81) is operated, so that the rotary hole cap piece (81) is rotated a certain angle to the close position (92) to complete mounting of the unlocking hole cap (8).

7. The storage-facilitated shaft joystick according to claim 1, wherein the storage cavity (20) is also used for storing a USB data wire (30).

8. The storage-facilitated shaft joystick according to claim 1, wherein a height of the storage cavity (20) in the space below the 45-degree wrist fitting region (12) is greater than a sum of a height of the placement tray (6) and a height of a ball top of the lever (2).

\* \* \* \* \*